US009752493B2

United States Patent
Malone

(10) Patent No.: US 9,752,493 B2
(45) Date of Patent: Sep. 5, 2017

(54) VALVE WITH INTEGRATED WAX MOTOR BYPASS FAIL SAFE

(71) Applicant: Cooper-Standard Automotive Inc., Novi, MI (US)

(72) Inventor: David S. Malone, Attica, MI (US)

(73) Assignee: Hanon Systems, Daejeon-Si (KR)

( * ) Notice: Subject to any disclaimer, the term of this patent is extended or adjusted under 35 U.S.C. 154(b) by 610 days.

(21) Appl. No.: 14/369,284

(22) PCT Filed: Feb. 20, 2013

(86) PCT No.: PCT/US2013/026809
§ 371 (c)(1),
(2) Date: Jun. 27, 2014

(87) PCT Pub. No.: WO2013/126374
PCT Pub. Date: Aug. 29, 2013

(65) Prior Publication Data
US 2014/0374495 A1     Dec. 25, 2014

Related U.S. Application Data

(60) Provisional application No. 61/600,804, filed on Feb. 20, 2012.

(51) Int. Cl.
*F01P 7/02* (2006.01)
*F24F 11/00* (2006.01)
(Continued)

(52) U.S. Cl.
CPC .............. *F01P 7/165* (2013.01); *F01P 7/14* (2013.01); *G05D 23/1852* (2013.01);
(Continued)

(58) Field of Classification Search
CPC .... F01P 2007/146; F01P 2031/00; F01P 7/14; G05D 23/1852; G05D 23/1854
(Continued)

(56) References Cited

U.S. PATENT DOCUMENTS 3,738,571 A * 6/1973 Elmer ...................... F01P 7/08
137/625.69
3,902,663 A * 9/1975 Elmer ..................... F01P 7/087
123/41.12
(Continued)

OTHER PUBLICATIONS

International Search Report and Written Opinion for International Application No. PCT/US2013/026809 mailed on Apr. 23, 2013.
(Continued)

*Primary Examiner* — Henry Crenshaw
(74) *Attorney, Agent, or Firm* — Carlson, Gaskey & Olds, P.C.

(57) ABSTRACT

A valve includes a housing including a plurality of ports including an inlet port in communication with a radiator. The valve includes a cylinder located in the housing that includes a plurality of apertures and a fail safe opening. The cylinder is moveable such that one of the plurality of apertures can be aligned with one of the plurality of ports of the housing to determine a flow of a fluid through the valve. The valve includes a moveable feature moveable with and relative to the cylinder, and the moveable feature covers the fail safe opening of the cylinder when a temperature of the fluid flowing through the valve is below a threshold temperature.

19 Claims, 10 Drawing Sheets

(51) Int. Cl.
*F01P 9/00* (2006.01)
*B60H 1/00* (2006.01)
*F01P 7/16* (2006.01)
*F01P 7/14* (2006.01)
*G05D 23/185* (2006.01)

(52) U.S. Cl.
CPC .... *G05D 23/1854* (2013.01); *F01P 2007/146* (2013.01); *F01P 2031/00* (2013.01)

(58) Field of Classification Search
USPC ................. 123/41.1; 165/41; 236/34.5, 93 R
See application file for complete search history.

(56) References Cited

U.S. PATENT DOCUMENTS

| | | | | |
|---|---|---|---|---|
| 4,453,668 A * | 6/1984 | Abel | ........................ | F01P 11/16 236/100 |
| 4,883,225 A * | 11/1989 | Kitchens | .................... | F01P 7/16 137/73 |
| 4,942,849 A * | 7/1990 | Shelton | ..................... | F01P 7/16 123/41.1 |
| 5,361,980 A * | 11/1994 | Stout | ........................ | F01P 11/16 137/72 |
| 5,381,952 A * | 1/1995 | Duprez | .................... | F01P 11/16 236/34.5 |
| 6,386,150 B1 * | 5/2002 | Iwaki | ................... | G05D 23/022 123/41.1 |
| 6,457,652 B1 * | 10/2002 | Fukamachi | ............... | F01P 7/16 236/34.5 |
| 2004/0173167 A1 * | 9/2004 | Chanfreau | ......... | B60H 1/00485 123/41.1 |
| 2004/0238159 A1 * | 12/2004 | Humburg | ........... | B60H 1/00485 165/41 |
| 2008/0245881 A1 * | 10/2008 | Peric | ........................ | F01P 7/14 236/93 R |
| 2014/0374495 A1 * | 12/2014 | Malone | .................... | F01P 7/14 236/34.5 |

OTHER PUBLICATIONS

International Preliminary Report on Patentability for International Application No. PCT/US2013/026809 mailed Sep. 4, 2014.

* cited by examiner

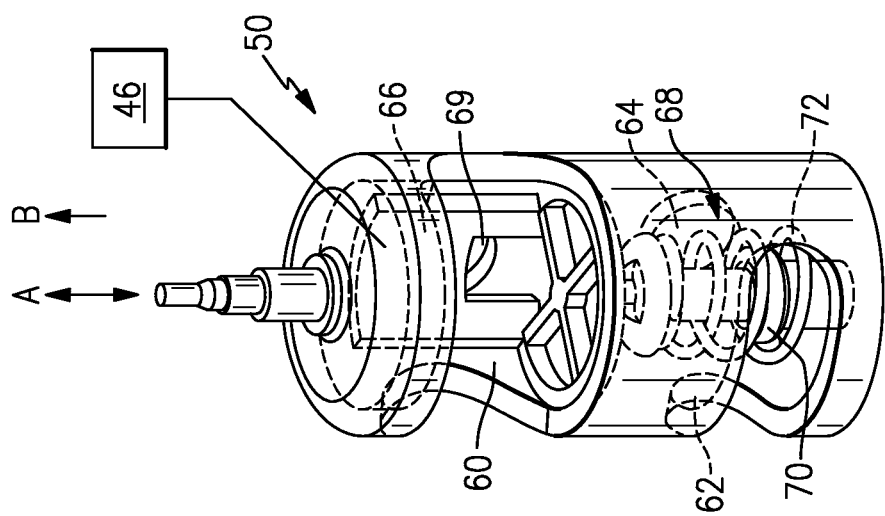
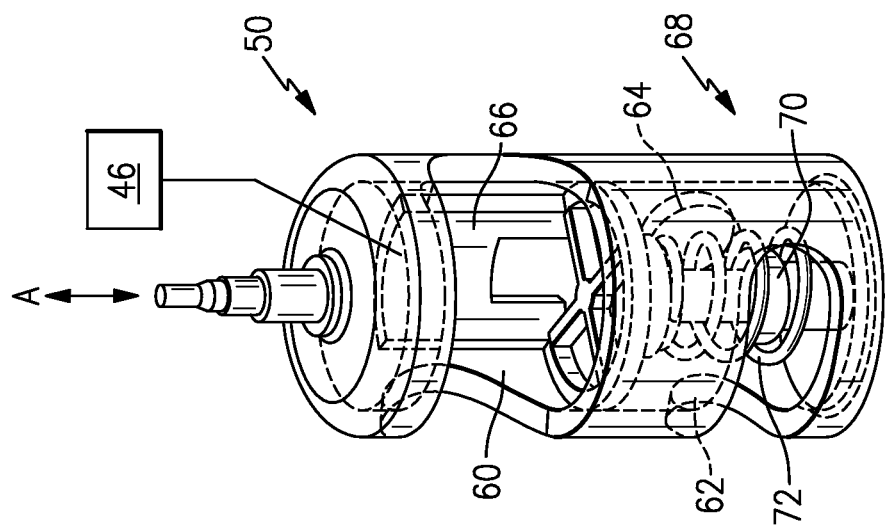
FIG.4
FIG.5

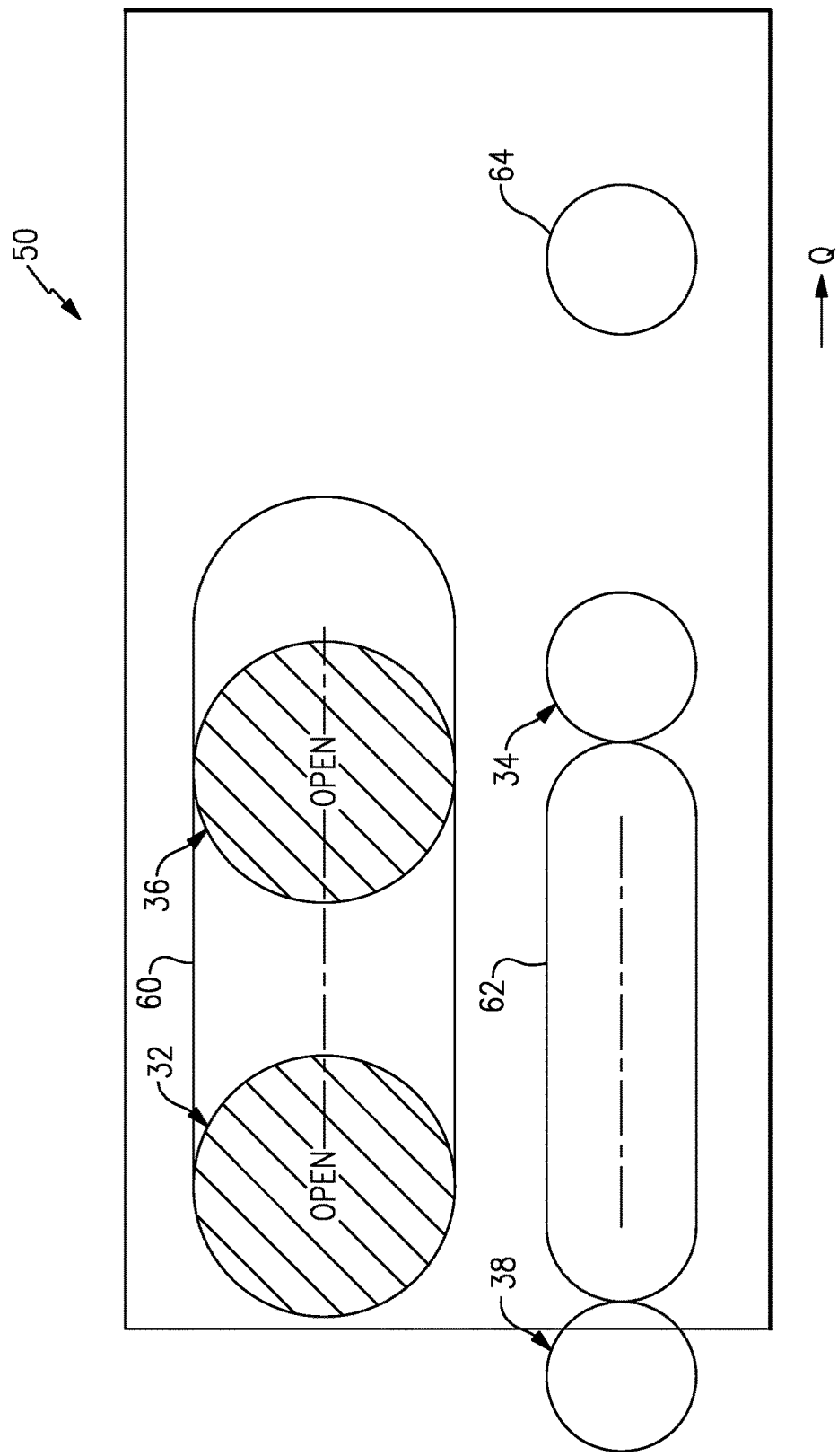

VALVE WITH INTEGRATED WAX MOTOR BYPASS FAIL SAFE

This application is a United States National Phase application of PCT Application No. PCT/US2013/026809 filed Feb. 20, 2013, which claims priority to U.S. Provisional Application No. 61/600,804 filed Feb. 20, 2012.

BACKGROUND OF THE INVENTION

A coolant system includes a valve that controls a flow of coolant through a radiator, an engine and a vehicle cabin. If the valve fails, the coolant could stop flowing through the coolant system, and the temperature of the engine can increase, possibly damaging the engine.

SUMMARY OF THE INVENTION

A valve includes a housing including a plurality of ports including an inlet port in communication with a radiator. The valve includes a cylinder located in the housing that includes a plurality of apertures and a fail safe opening. The cylinder is moveable such that one of the plurality of apertures can be aligned with one of the plurality of ports of the housing to determine a flow of a fluid through the valve. The valve includes a moveable feature moveable with and relative to the cylinder, and the moveable feature covers the fail safe opening of the cylinder when a temperature of the fluid flowing through the valve is below a threshold temperature. The valve includes an actuator including a portion made of a material that changes shape when exposed to the fluid having a temperature greater than or equal the threshold temperature to move at least a portion of the actuator to move the moveable feature relative to the cylinder and expose the fail safe opening to allow the fluid to flow through the inlet port and into the valve.

A coolant system includes a water pump, a radiator, an engine, a vehicle cabin and a valve. The valve includes a housing including a plurality of ports including an inlet port in communication with the radiator, an outlet port in communication with the water pump, a second inlet port in communication with the engine, and a third inlet port in communication with the cabin. A fluid flows from the outlet port of the valve to the water pump, from the water pump to the engine and to the vehicle cabin, and from the engine to the radiator. The valve includes a cylinder located in the housing that includes a plurality of apertures and a fail safe opening, and the cylinder is moveable such that one of the plurality of apertures can be aligned with one of the plurality of ports of the housing to determine a flow of the fluid through the valve. The valve includes a moveable feature moveable with and relative to the cylinder, and the moveable feature covers the fail safe opening of the cylinder when a temperature of the fluid flowing through the valve is below a threshold temperature. The valve includes an actuator including a portion made of a material that changes shape when exposed to the fluid having a temperature greater than or equal the threshold temperature to move at least a portion of the actuator to move the moveable feature relative to the cylinder and expose the fail safe opening to allow the fluid to flow through the inlet port and into the valve.

BRIEF DESCRIPTION OF THE DRAWINGS

FIG. 4 schematically illustrates a barrel of the valve including various ports during normal operation;
FIG. 5 schematically illustrates the barrel of the valve including various ports when an actuator actuates a fail safe feature;
FIG. 11 schematically illustrates a flattened version of the barrel of the valve when the barrel has rotated slightly from the position of FIG. 10 when only cool coolant from the radiator flows into the valve.

DETAILED DESCRIPTION OF THE PREFERRED EMBODIMENTS

Figure 1:
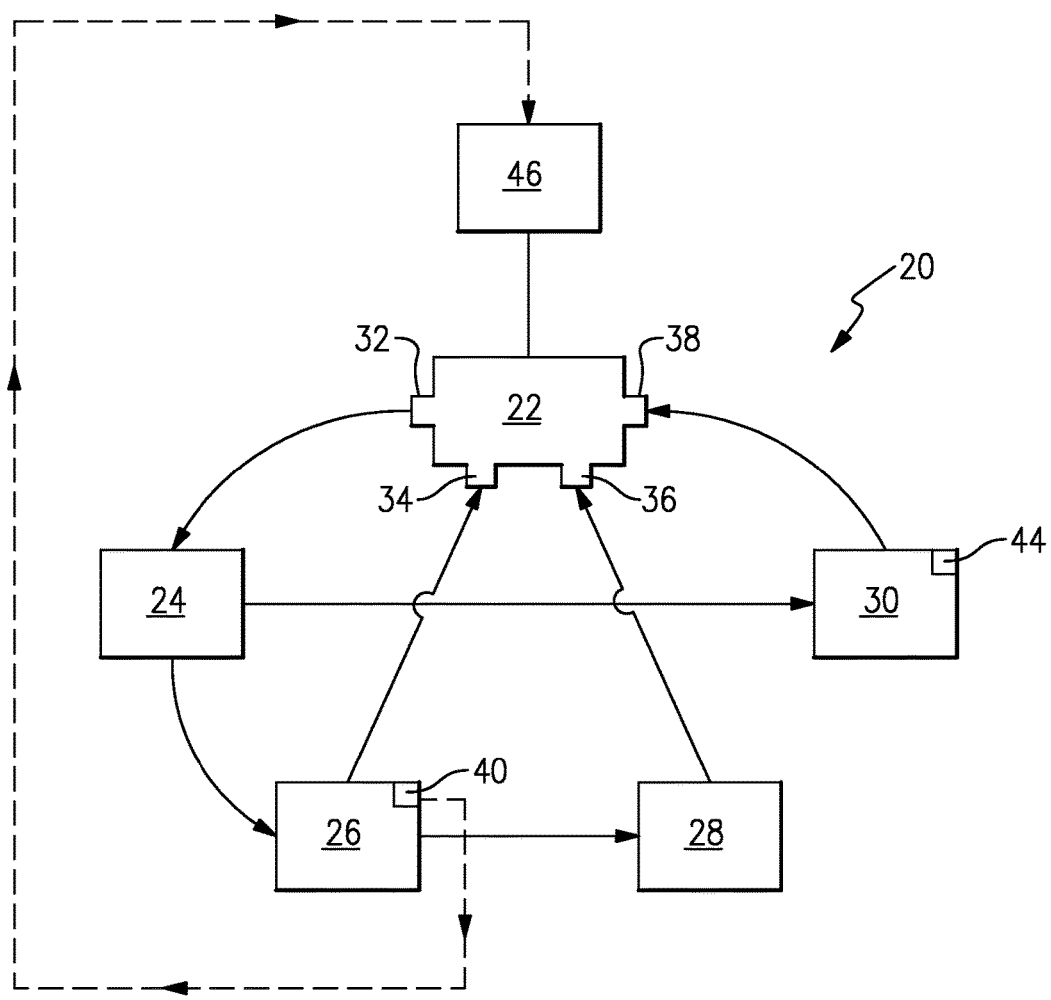
FIG. 1 schematically illustrates a coolant system.

FIG. 1 schematically illustrate a coolant system 20. The coolant system 20 includes a valve 22, a water pump 24, an engine 26, a radiator 28, and a vehicle cabin 30. In one example, the engine 26 is an internal combustion engine. A fluid, such as coolant, flows through the coolant system 20. The fluid flows through an outlet port 32 of the valve 22 to the water pump 24. The coolant from the water pump 24 can be directed to the engine 26 to cool the engine 26. Hot coolant from the engine 26 can flow through an inlet port 34 of the valve 22. A sensor 40 detects a temperature near or around the engine 26. The coolant then flows to the radiator 28, which acts as a heat exchanger. A control 44 controls a temperature in the vehicle cabin 30 as set by the vehicle operator. Cold coolant can flow from the radiator 28 to an inlet port 36 of the valve 22. The coolant from the water pump 24 can be directed to the vehicle cabin 30 to heat the vehicle cabin 30. The hot coolant can from the vehicle cabin 30 can flow through an inlet port 38 of the valve 22. An engine control unit 46 controls the fluid communication into the ports 34, 36 and 38 and therefore the flow of coolant through the valve 22.

Figure 2:
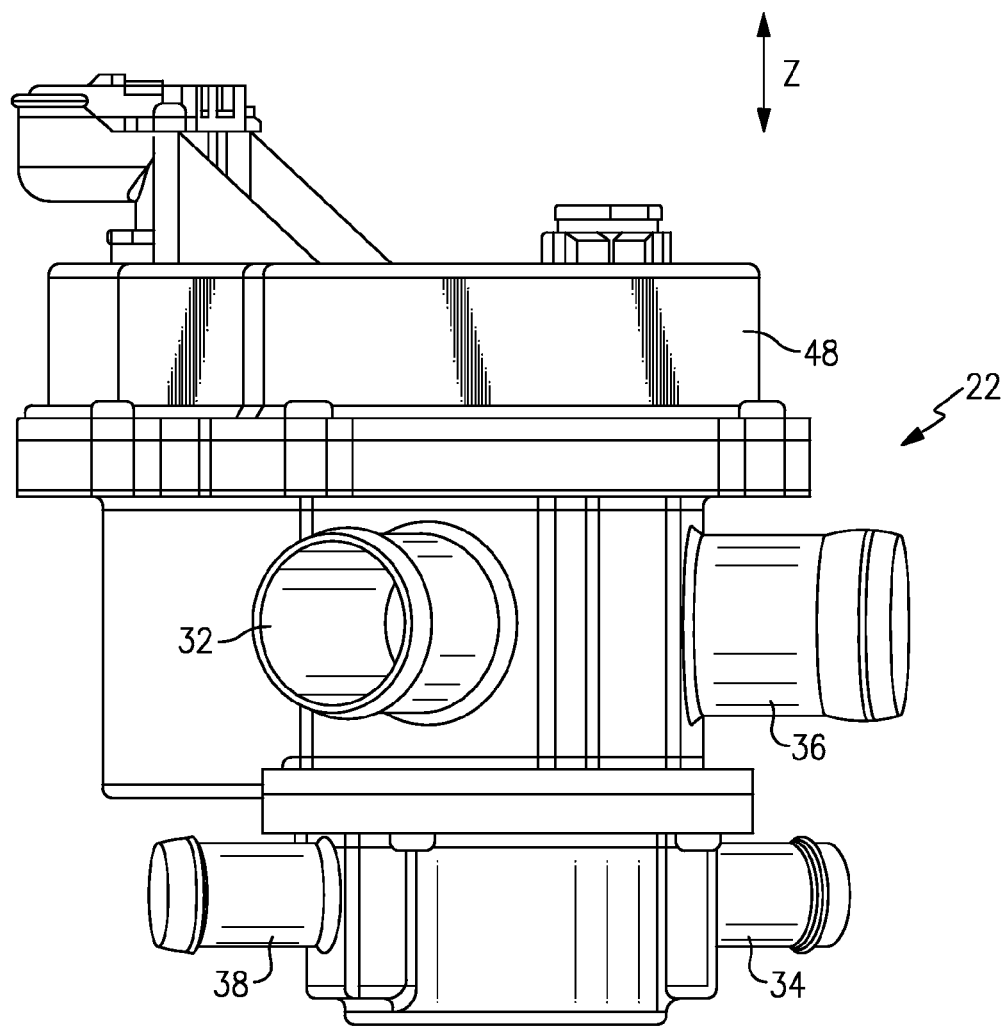
FIG. 2 schematically illustrates a perspective view of a valve of the coolant system.

FIG. 2 illustrates a perspective view of a housing 48 of the valve 22. The valve 22 includes the outlet port 32 that directs coolant to the water pump 24, the inlet port 34 that can receive hot coolant from the engine 26, the inlet port 36 that can receive cold coolant from the radiator 28, and the inlet port 38 that can receive hot coolant from the vehicle cabin 30.

Figure 3:
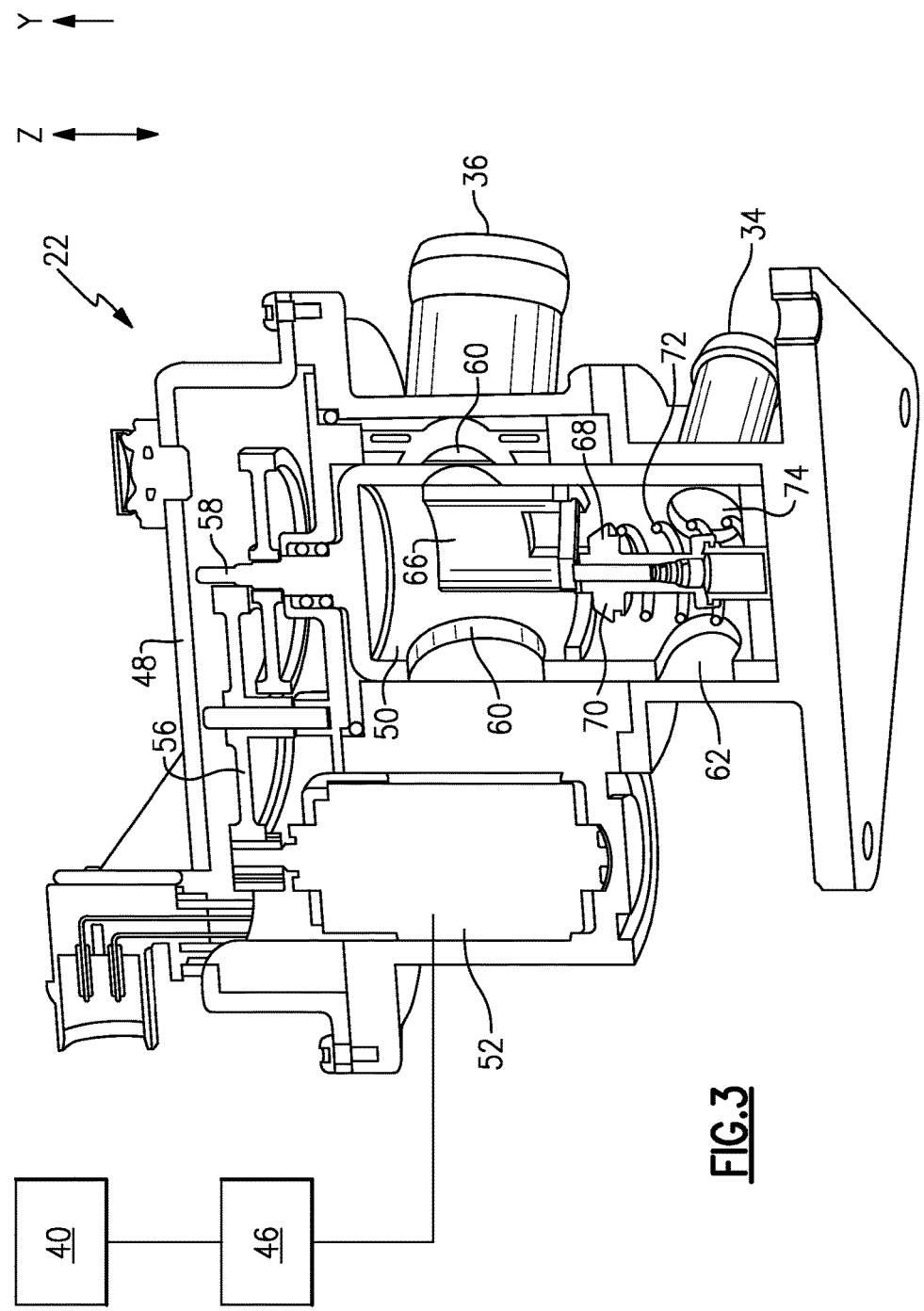
FIG. 3 schematically illustrates a cross-sectional internal view of the valve.

FIG. 3 illustrates the valve 22 including the housing 48 and the inlet port 34 and the inlet port 36 (the outlet port 32 and the inlet port 38 are not visible in FIG. 3). A hollow barrel 50 is received within the housing 48. In another example, a ball is received within the housing 48. In one example, the barrel 50 has a substantially cylindrical shape. The barrel 50 rotates relative to the housing 48 with respect to an axis Z to control a flow of coolant through the valve 22. A position of the barrel 50 determine the flow of coolant through the valve 22.

Based on a temperature near or around the engine 26 as detected by the sensor 40, the engine control unit 46 provides a signal to a motor 52 to rotate the barrel 50 to obtain a desired flow of coolant through the valve 22 and therefore the coolant system 20. The motor 52 is located in the housing 48. When a change in a temperature of the coolant in the cooling system 20 is required, the engine control unit 46 sends a signal to the motor 52, and the motor 52 actuates gears 56 to rotate a valve stem 58 to rotate the barrel 50 relative to the housing 48 such that the barrel 50 is positioned to provide the desired flow path of coolant through the valve 22 to obtain a desired coolant temperature.

FIG. 4 illustrates the barrel 50 of the valve 22. The barrel 50 includes an upper slot 60, a lower slot 62, and a lower hole 64. Depending upon the position of the barrel 50 relative to the housing 48, the upper slot 60 controls a flow of the fluid to the water pump 24 through the outlet port 32 and from the radiator 28 through the inlet port 36. Depending upon the position of the barrel 50 relative to the housing 48, the lower slot 62 can provide fluid communication from the vehicle cabin 30 through the inlet port 38. Depending upon the position of the barrel 50 relative to the housing 48, the lower hole 64 can provide fluid communication from the engine 26 through the inlet port 34.

A slider 66 located in the barrel 50 rotates with the barrel 50. During normal operation of the valve 22, the slider 66 is in a lowered position (shown in FIG. 4). The barrel 50 also includes an upper hole 69, or fail safe opening, (shown in FIG. 5) that is covered by the slider 66 during normal operation when the slider 66 is in the lowered position.

The sensor 40 detects the temperature near or around the engine 26 and provides the temperature to the engine control unit 46. The engine control unit 46 sends a signal for the motor 52 to rotate the barrel 50 relative to the housing 48 to result in a desired flow of coolant through the valve 22 based on the temperature. This operation is described below with respect to FIGS. 7 to 11.

However, if there is a failure in the valve 22 or somewhere in the coolant system 20, the barrel 50 might not rotate, and the upper slot 60 of the barrel 50 might not be aligned with the inlet port 36 of the radiator 28. This could prevent the cool coolant from the radiator 28 from flowing through the inlet port 36 of the valve 22 and could damage the engine 26.

As shown in FIG. 5, if the valve 22 experiences a failure such that cool coolant from the radiator 28 does not enter the valve 22 and therefore the system 22, the temperature of the coolant flowing through the coolant system 20 increases. A thermally activated actuator 68 in the barrel 50 including a guide 70 and a spring 72 moves the slider 66 upwardly in the direction Y. The slider 66 no longer blocks the upper hole 69, allowing cooled coolant from the radiator 28 to enter the valve 22 through the inlet port 36 and the upper hole 69 and flow through the coolant system 20 to cool the engine 26, providing a fail safe feature. In another example, the slider 66 rotates or is a cam.

Figure 6:
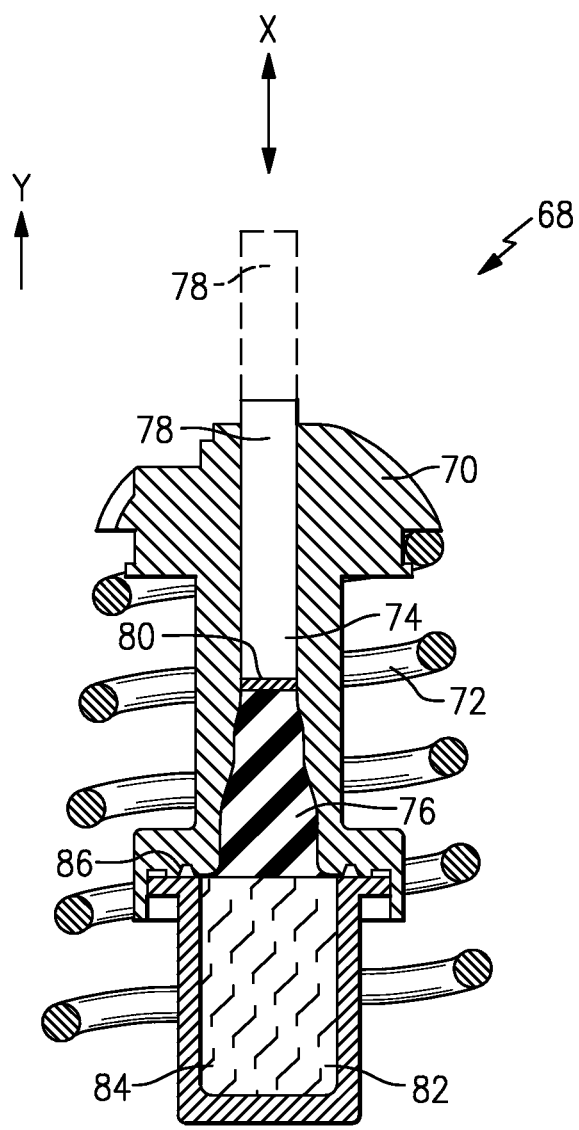
FIG. 6 schematically illustrates a thermostat that allows cold coolant to enter the valve if a failure occurs.

FIG. 6 illustrates the actuator 68 including the guide 70 surrounded by the spring 72. The guide 70 including a passage 74 that receives a rubber plug 76 located under a piston 78. A disc 80 is located between the rubber plug 76 and the piston 78. The actuator 68 includes a pellet 82 received in a cup 84 that can change shape. In one example, the pellet 82 is made of wax and is expandable when exposed to a specific temperature. In another example, the pellet 82 is made of a bi-metallic material and includes a portion that raises when exposed to a specific temperature. A diaphragm 86 is located between the cup 84 and the guide 70.

If the pellet 82 is wax, the wax melts and changes from a solid state to a liquid state, causing an increase in volume and therefore expansion of the pellet 82. If the pellet 82 is made of a bi-metallic material, one of the materials of the pellet 82 changes shape, and a portion of the pellet 82 raises. When the pellet 82 expands or raises, the rubber plug 76 pushes upwardly in the direction Y in the passage 74 to eventually push the piston 78 upwardly (to a position shown in phantom lines in FIG. 6). The piston 78 eventually contacts the slider 66, and the slider 66 raises in the direction Y to expose the upper hole 69 and allow the cooled coolant from the radiator 28 to enter the valve 22 through the inlet port 36 and through the upper hole 69, and therefore allow the coolant system 20 to cool the engine 26.

The material of the pellet 82 is selected such that that it will expand or raise when the coolant reaches a threshold temperature above an operating temperature to prevent failure of the engine 26. In one example, when the temperature near or around the engine 26 is greater than or equal to a threshold temperature 110° C., the pellet 82 expands or raises to lift the slider 66, allowing cold coolant to flow through the upper hole 69 and into the valve 22. However, any threshold temperature can be employed based on the vehicle requirements. Additionally, any material can be used that would expand or lift when exposed to the coolant greater than the threshold temperature.

The coolant can be provided to the valve 22 from the engine 26 and/or the vehicle cabin 30 based on the position of the barrel 50 in the housing 48 of the valve 22. In one example (shown in FIG. 7 below), the coolant is only provided from the vehicle cabin 30. Therefore, if the valve 22 fails, the actuator 68 provides a fail safe feature.

FIGS. 7 to 11 illustrate rotation of the barrel 50 during normal operation of the valve 22.

Figure 7:
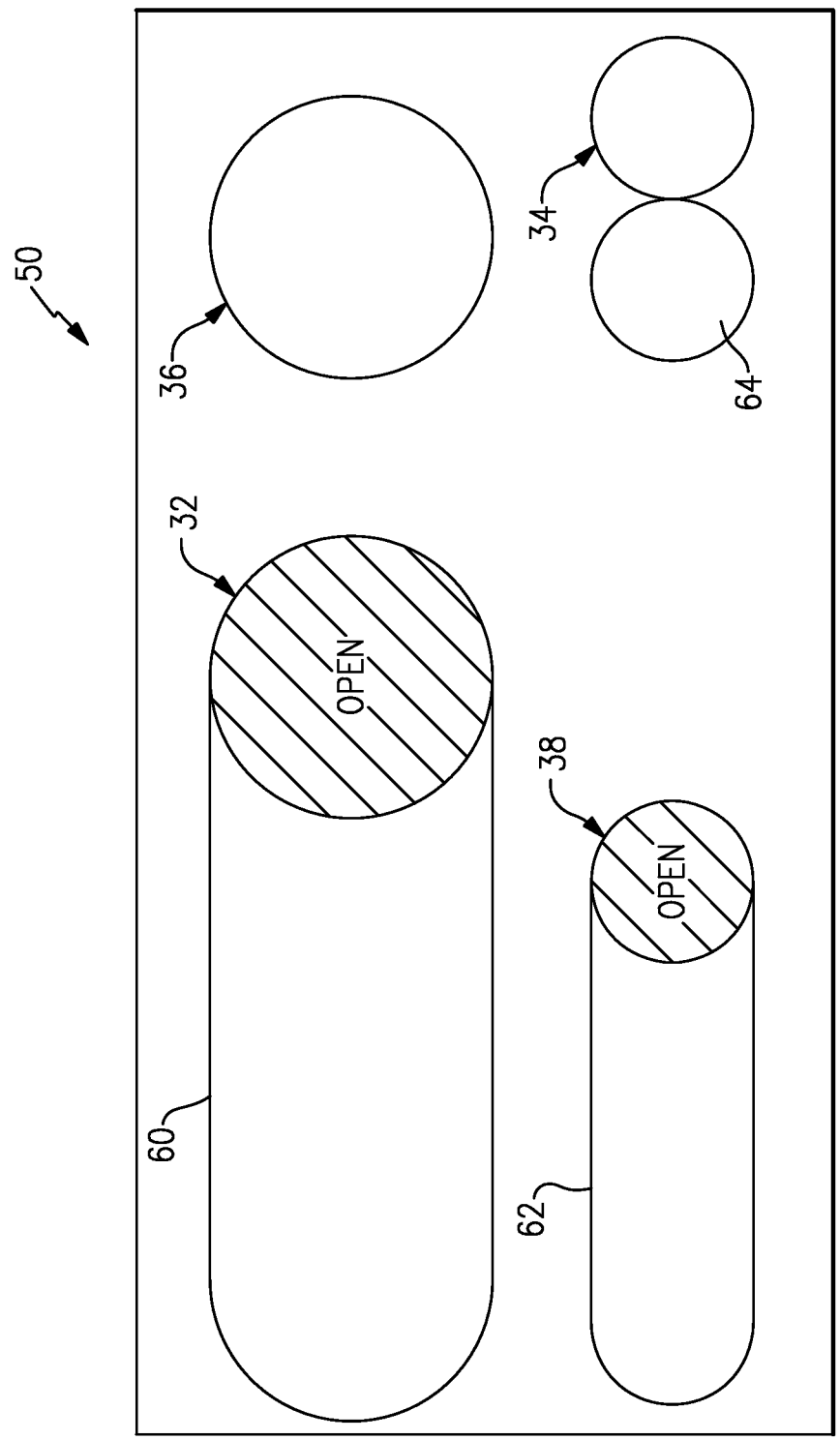
FIG. 7 schematically illustrates a flattened version of the barrel of the valve when hot coolant flows from a vehicle cabin into the valve.

FIG. 7 illustrates a flattened version of the barrel 50. The upper slot 60 of the barrel 50 is aligned with the outlet port 32 of the housing 48, which allows for the communication of coolant through the outlet port 32 to the water pump 24. The lower slot 62 of the barrel 50 is aligned with the inlet port 38 of the housing 48, which allows for the communication of hot coolant through the inlet port 38 from the vehicle cabin 30. The lower hole 64 is not aligned with the inlet port 34 of the housing 48, preventing hot coolant from the engine 26 from flowing into the valve 22. The inlet port 36 of the housing 48 is blocked by the barrel 50 to prevent communication of cool coolant from the radiator 28. In this position, only hot coolant from the vehicle cabin 30 enters the valve 22. In this example, the temperature of the coolant is X° C. The temperature X° C. depends on the requirements of the coolant system 20 and the vehicle in which the coolant system 20 is employed.

Figure 8:
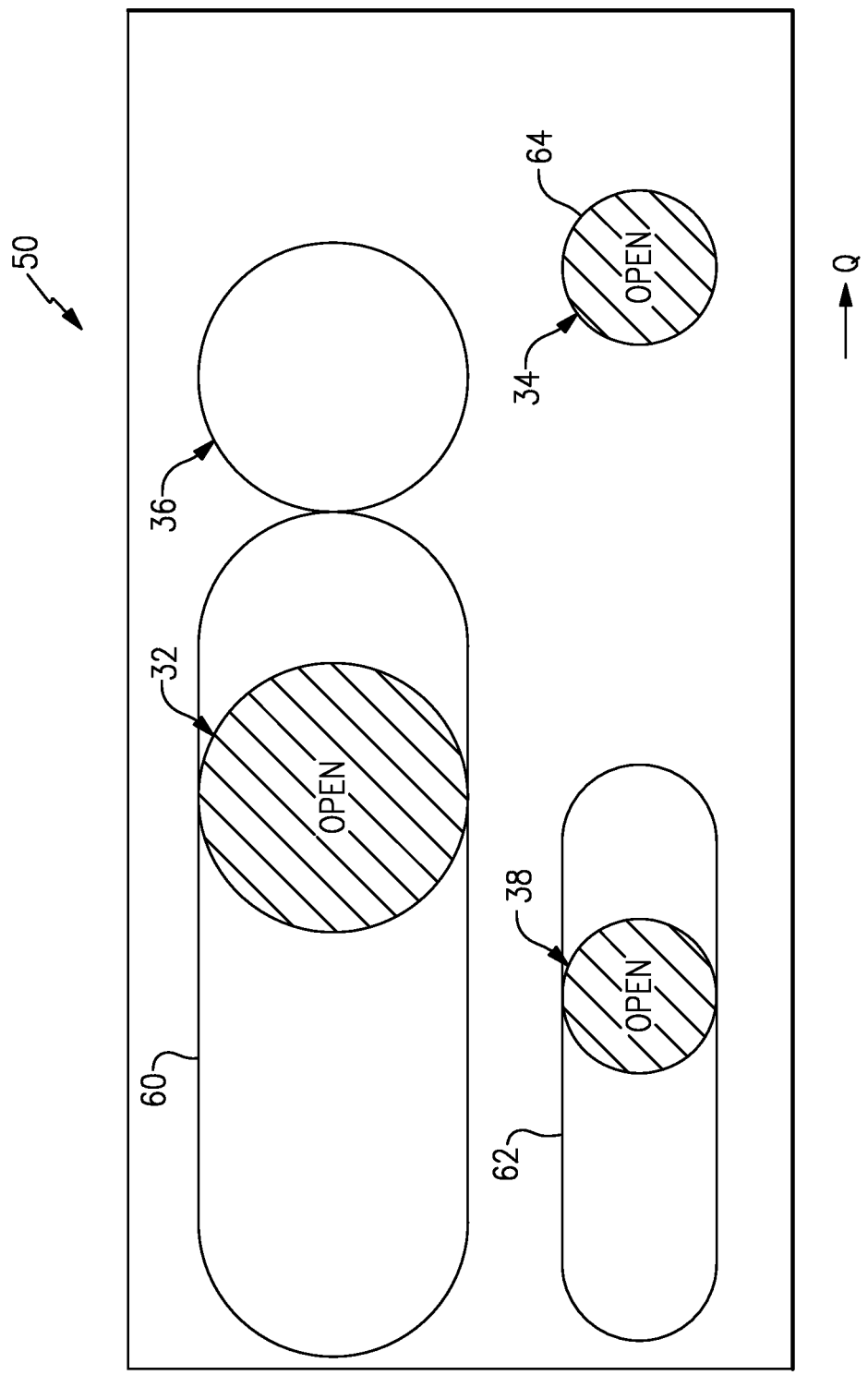
FIG. 8 schematically illustrates a flattened version of the barrel of the valve when the barrel has rotated slightly from the position of FIG. 7 and hot coolant from both an engine and the vehicle cabin flow into the valve.

When the sensor 40 of the engine 26 detects a temperature that is X° C.+A° C., the engine control unit 46 sends a signal to the motor 52 to rotate the barrel 50 about the axis Z in a direction Q to the position of FIG. 8.

FIG. 8 illustrates a flattened version of the barrel 50 when the barrel 50 has rotated in the direction Q from the position of FIG. 7. The upper slot 60 of the barrel 50 is aligned with the outlet port 32 of the housing 48, which allows for the communication of coolant through the outlet port 32 to the water pump 24. The lower slot 62 of the barrel 50 is aligned with the inlet port 38 of the housing 48, which allows for the communication of hot coolant through the inlet port 38 from the vehicle cabin 30. The lower hole 64 of the barrel 50 is aligned with the inlet port 34 of the housing 48, which allows for the communication of hot coolant through the inlet port 34 from the engine 26. The inlet port 36 of the housing 48 is blocked by the barrel 50 to prevent communication of cool coolant from the radiator 28. In this position, hot coolant from both the vehicle cabin 30 and the engine 26 enters the valve 22.

When the sensor 40 of the engine 26 detects a temperature that is X° C.+B° C. (B° C. is greater than A° C.), the engine control unit 46 sends a signal to the motor 52 to rotate the barrel 50 about the axis Z in the direction Q to the position of FIG. 9.

Figure 9:
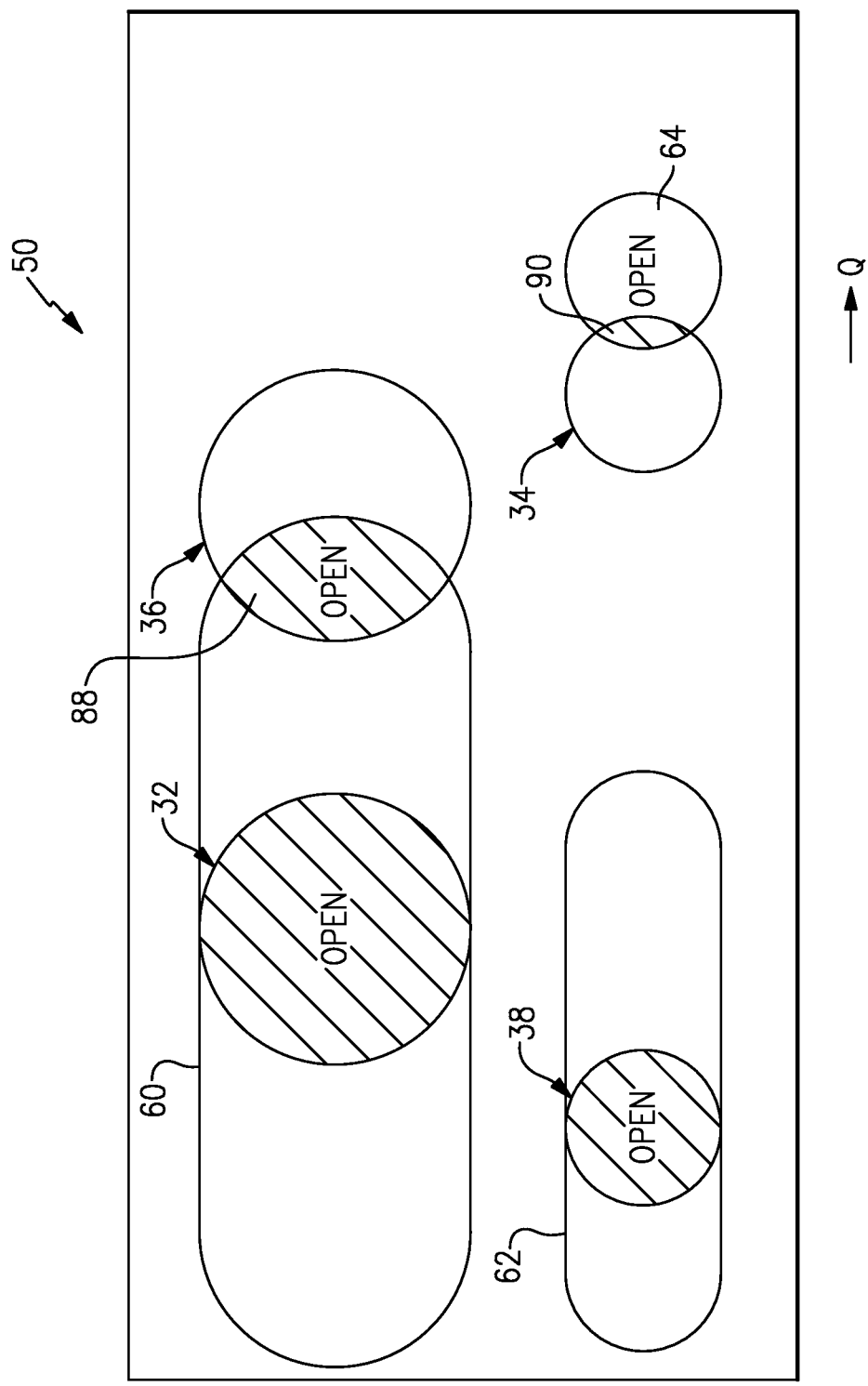
FIG. 9 schematically illustrates a flattened version of the barrel of the valve when the barrel has rotated slightly from the position of FIG. 8 and some hot coolant from the engine, hot coolant from the vehicle cabin, and some cool coolant from a radiator flow into the valve.

FIG. 9 illustrates a flattened version of the barrel 50 when the barrel 50 has rotated in the direction Q from the position of FIG. 8 based on the signal from the engine control unit 46. The upper slot 60 of the barrel 50 is aligned with the outlet port 32 of the housing 48, which allows for the communication of coolant through the outlet port 32 to the water pump 24. The lower slot 62 of the barrel 50 is aligned with the inlet port 38 of the housing 48, which allows for the communication of hot coolant through the inlet port 38 from the vehicle cabin 30. The lower hole 64 of the barrel 50 is partially aligned with the inlet port 34 of the housing 48 at a space 90, which allows for partial communication of hot coolant through the inlet port 34 from the engine 26. The upper slot 60 of the barrel 50 is partially aligned with the inlet port 36 of the housing 48 at a space 88, which allows for partial communication of cool coolant through the inlet port 36 from the radiator 28. In this position, hot coolant from the vehicle cabin 30, some hot coolant from the engine 26, and some cool coolant from the radiator 28 enters the valve 22. That is, the amount of hot coolant entering the valve 22 from the engine 26 is reduced, and the amount of cool coolant entering the valve 22 from the radiator 28 increases, while hot coolant from the vehicle cabin 30 still flows into the valve 22. This increases the amount of cool coolant provided into the valve 22 and therefore the coolant system 20.

When the sensor 40 of the engine 26 detects a temperature that is X° C.+C° C. (C° C. is greater than B° C.), the engine control unit 46 sends a signal to the motor 52 to rotate the barrel 50 about the axis Z in the direction to the position of FIG. 10.

Figure 10:
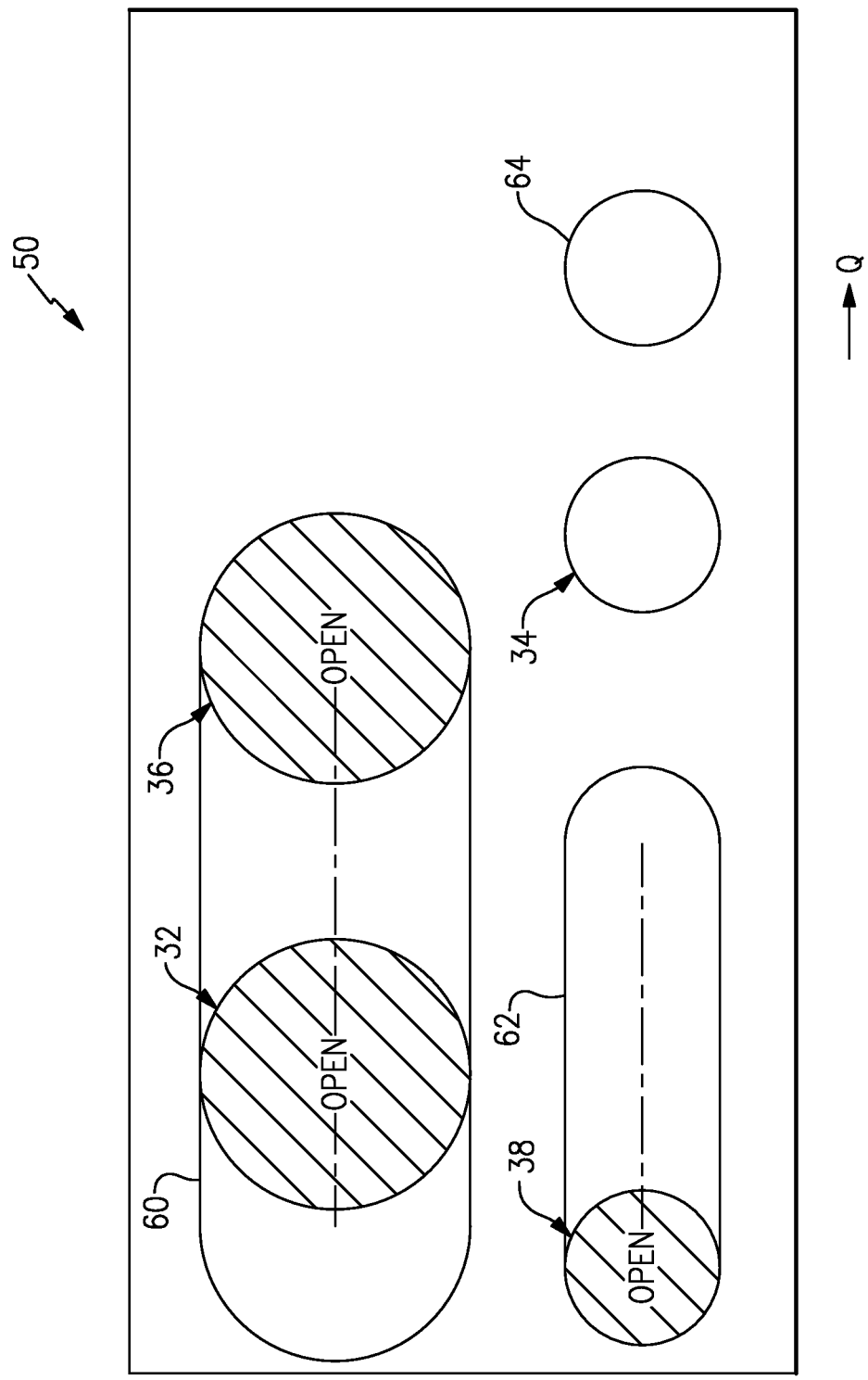
FIG. 10 schematically illustrates a flattened version of the barrel of the valve when the barrel has rotated slightly from the position of FIG. 9 when both cool coolant from the radiator and hot coolant from the vehicle cabin flow into the valve.

FIG. 10 illustrates a flattened version of the barrel 50 when the barrel 50 has rotated in a direction Q from the position of FIG. 8 based on a signal from the engine control unit 46. The upper slot 60 of the barrel 50 is aligned with the outlet port 32 of the housing 48, which allows for the communication of coolant through the outlet port 32 to the water pump 24. The lower slot 62 of the barrel 50 is aligned with the inlet port 38 of the housing 48, which allows for the communication of hot coolant through the inlet port 38 from the vehicle cabin 30. The lower hole 64 of the barrel 50 is not aligned with the inlet port 34 of the housing 48, preventing entry of hot coolant from the engine 26 through the inlet port 34. The upper slot 60 of the barrel 50 is aligned with the inlet port 36 of the housing 48, which allows for communication of cool coolant through the inlet port 36 from the radiator 28. In this position, both hot coolant from the vehicle cabin 30 and cool coolant from the radiator enter the valve 22. This further increases the amount of cool coolant provided into the valve 22 and therefore the coolant system 20, while reducing the amount of hot coolant provided into the valve 22 from the engine 26.

When the sensor 40 of the engine 26 detects a temperature that is X° C.+D° C. (D° C. is greater than C° C.), the engine control unit 46 sends a signal to the motor 52 to rotate the barrel 50 about the axis Z in the direction to the position of FIG. 11.

FIG. 11 a flattened version of the barrel 50 when the barrel 50 has rotated in the direction Q from the position of FIG. 9 based on a signal from the engine control unit 46. The upper slot 60 of the barrel 50 is aligned with the outlet port 32 of the housing 48, which allows for the communication of coolant through the outlet port 32 to the water pump 24. The lower slot 62 of the barrel 50 is not aligned with either of the ports 34 or 38, and no hot coolant enters the valve 22 through the inlet port 38 from the vehicle cabin 30 or through the inlet port 34 from the engine 26. The upper slot 60 of the barrel 50 is aligned with the inlet port 36 of the housing 48, which allows for communication of cool coolant through the inlet port 36 from the radiator 28. In this position, no hot coolant from the vehicle cabin 30 or the engine 26 enters the valve 22, and the cool coolant from the radiator enters the valve 22. Therefore, only cold coolant enters the valve 22.

The engine control unit 46 rotates the barrel 50 so that it is positioned to allow the desired coolant flow into the coolant system 20 based on the temperature detected by the sensor 40 of the engine 26.

The temperatures X° C., A° C., B° C., C° C., D° C., and E° C. depend on the requirements of the coolant system 20 and the vehicle in which the coolant system 20 is employed.

In one another example, the actuator 68 with the pellet 82 is not used as a fail safe feature, but is instead used to allow the flow of cool coolant from the radiator 28 through the inlet port 36 and into valve 22. In this example, the temperature that causes the pellet 82 to expand or rise to lift the slider 66 in the direction Y falls within an operating temperature of the coolant flowing through the coolant system 20. In this example, the material of the pellet 82 is selected such that it expands or raises at the specified temperature.

In another example, even if the engine control unit 46 determines that only cool coolant from the radiator 28 is to be directed to the valve 22 (as shown in FIG. 11), a vehicle occupant can override this. For example, if it desired to heat the vehicle cabin 30, the occupant can set the control 44 in the vehicle cabin 30 to direct heat into the vehicle cable 30. In this instance, the barrel 50 would rotate in an opposite direction to one of the previous positions (such as shown in FIGS. 9 and 10) to allow hot coolant from the engine 26 to flow to the valve 22 to increase the temperature of the coolant circulating through the coolant system 20.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:
1. A valve comprising:
 a housing including a plurality of ports including an inlet port in communication with a radiator;
 a cylinder located in the housing including a plurality of apertures and a fail safe opening, wherein the cylinder is moveable such that one of the plurality of apertures can be aligned with one of the plurality of ports of the housing to determine a flow of a fluid through the valve;

a moveable feature moveable with and relative to the cylinder, wherein the moveable feature covers the fail safe opening of the cylinder when a temperature of the fluid flowing through the valve is below a threshold temperature; and an actuator including a portion made of a material that changes shape when exposed to the fluid having a temperature greater than or equal the threshold temperature to move a portion of the actuator to move the moveable feature relative to the cylinder and expose the fail safe opening to allow the fluid to flow through the inlet port and into the valve.

2. The valve as recited in claim 1 wherein the housing includes an outlet port in communication with a water pump, a second inlet port in communication with an engine, and a third inlet port in communication with a vehicle cabin, wherein the fluid flows from the outlet port of the valve to the water pump, from the water pump to the engine and to the vehicle cabin, and from the engine to the radiator.

3. The valve as recited in claim 2 wherein a sensor detects an engine temperature near or around the engine and an engine control unit provides a signal to move the cylinder in response to the engine temperature detected near or around the engine to provide a desired flow of the fluid through the valve.

4. The valve as recited in claim 2 wherein the cylinder includes an upper slot, a lower slot, and a lower hole.

5. The valve as recited in claim 4 wherein a position of the upper slot relative to the housing controls a flow of the fluid through the outlet port to the water pump and through the inlet port from the radiator.

6. The valve as recited in claim 4 wherein a position of the lower slot relative to the housing controls a flow of the fluid through the third inlet port from the vehicle cabin.

7. The valve as recited in claim 4 wherein a position of the lower hole relative to the housing controls a flow of the fluid through the second inlet port from the engine.

8. The valve as recited in claim 4 wherein the moveable feature is in a lowered position and covers the fail safe opening of the cylinder during normal operation of the valve.

9. The valve as recited in claim 4 wherein the actuator slides the moveable feature to expose the fail safe opening when the material is exposed to the fluid having the temperature greater than or equal to the threshold temperature.

10. The valve as recited in claim 4 wherein the actuator includes a guide including a passage that receives a piston, and the material expands when exposed to the fluid having a temperature greater than or equal to the threshold temperature to move the piston to move the moveable feature to allow the fluid to flow through the fail safe opening.

11. The valve as recited in claim 4 wherein when the cylinder is in a first position, the upper slot of the cylinder is aligned with the outlet port of the housing, the lower slot of the cylinder is aligned with the third inlet port, the fluid from the vehicle cabin enters the valve, and the temperature of the fluid is $X°$ C.

12. The valve as recited in claim 11 wherein when a sensor detects a temperature of $X°$ C.+$A°$ C., the engine control unit sends a signal to a motor to move the cylinder to a second position, the upper slot of the cylinder is aligned with the outlet port, the lower slot of the cylinder is aligned with the third inlet port, the lower hole is aligned with the second inlet port, and the fluid from the vehicle cabin and the engine enters the valve.

13. The valve as recited in claim 12 wherein a sensor detects a temperature of $X°$ C.+$B°$ C., wherein B is greater than A, the engine control unit sends a signal to a motor to move the cylinder to a third position, the upper slot of the cylinder is aligned with the outlet port, the lower slot of the cylinder is aligned with the third inlet port, the lower hole is partially aligned with second inlet port, the upper slot is partially aligned with the inlet port, and the fluid from the vehicle cabin, the engine and the radiator enters the valve.

14. The valve as recited in claim 13 wherein when a sensor detects a temperature is $X°$ C.+$C°$ C., wherein C is greater than B, the engine control unit sends a signal to a motor to move the cylinder to a fourth position, the upper slot of the cylinder is aligned with the outlet port, the lower slot of the cylinder is aligned with the third inlet port, the upper slot is aligned with the inlet port, and the fluid from the vehicle cabin and the radiator enters the valve.

15. The valve as recited in claim 14 when a sensor detects a temperature of is $X°$ C.+$D°$ C., wherein D is greater than C, the engine control unit sends a signal to a motor to move the cylinder to a fifth position, the upper slot of the cylinder is aligned with the outlet port and the inlet port, and the fluid from the radiator enters the valve.

16. The valve as recited in claim 1 wherein the material is one of wax and a bi-metallic material.

17. The valve as recited in claim 1 wherein the cylinder is rotatable within the housing to align one of the plurality of apertures with one of the plurality of ports of the housing.

18. The valve as recited in claim 1 including a motor that rotates the cylinder relative to the housing to provide a desired flowpath of the fluid through the valve.

19. A coolant system comprising:
a water pump;
a radiator;
an engine;
a vehicle cabin; and
a valve including:
a housing including a plurality of ports including an inlet port in communication with the radiator, an outlet port in communication with the water pump, a second inlet port in communication with the engine, and a third inlet port in communication with the vehicle cabin, wherein a fluid flows from the outlet port of the valve to the water pump, from the water pump to the engine and to the vehicle cabin, and from the engine to the radiator;
a cylinder located in the housing including a plurality of apertures and a fail safe opening, wherein the cylinder is moveable such that one of the plurality of apertures can be aligned with one of the plurality of ports of the housing to determine a flow of the fluid through the valve,
a moveable feature moveable with and relative to the cylinder, wherein the moveable feature covers the fail safe opening of the cylinder when a temperature of the fluid flowing through the valve is below a threshold temperature, and
an actuator including a portion made of a material that changes shape when exposed to the fluid having a temperature greater than or equal the threshold temperature to move a portion of the actuator to move the moveable feature relative to the cylinder and expose the fail safe opening to allow the fluid to flow through the inlet port and into the valve.

* * * * *

UNITED STATES PATENT AND TRADEMARK OFFICE
CERTIFICATE OF CORRECTION

PATENT NO. : 9,752,493 B2
APPLICATION NO. : 14/369284
DATED : September 5, 2017
INVENTOR(S) : David S. Malone It is certified that error appears in the above-identified patent and that said Letters Patent is hereby corrected as shown below:

In the Claims

In Claim 12, Column 7, Lines 62-63; before "sends a signal" replace "the engine control unit" with --an engine control unit--

Signed and Sealed this
Eighteenth Day of September, 2018

Andrei Iancu
*Director of the United States Patent and Trademark Office*